(12) United States Patent
Rhodes et al.

(10) Patent No.: US 6,922,565 B2
(45) Date of Patent: Jul. 26, 2005

(54) PUBLIC SAFETY ACCESS POINT (PSAP) SELECTION FOR E911 WIRELESS CALLERS IN A GSM TYPE SYSTEM

(75) Inventors: Jeffrey C. Rhodes, Redmond, WA (US); Tong Luo, Bellevue, WA (US); Victor Burton, Bellevue, WA (US); Christine Conner, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 413 days.

(21) Appl. No.: 10/314,278

(22) Filed: Dec. 9, 2002

(65) Prior Publication Data

US 2003/0186709 A1 Oct. 2, 2003

Related U.S. Application Data

(60) Provisional application No. 60/367,706, filed on Mar. 28, 2002.

(51) Int. Cl.$^7$ .................................................. H04Q 7/20
(52) U.S. Cl. ............................. 455/456.1; 455/404.1; 455/404.2; 455/456.5; 455/456.6; 455/521
(58) Field of Search ......................... 455/404.1, 404.2, 455/456.1, 456.5, 456.6, 457, 521

(56) References Cited

U.S. PATENT DOCUMENTS

2002/0042260 A1 * 4/2002 Saucedo et al. ............ 455/404

* cited by examiner

Primary Examiner—Nay Maung
Assistant Examiner—Raymond S. Dean
(74) Attorney, Agent, or Firm—William H. Bollman (57) ABSTRACT

Public safety access points are selected in a wireless network for E911 calls based on ESRD substitution when ESRKs are not being used. The present invention was conceived as an ESRK workaround solution to implement Phase II of the E911 rules from the starting point of a Phase I implementation. ESRKs, ESRDs or ESRVs are initially obtained and managed for each PSAP in a particular carrier's area. Then, Phase I processes are modified to wait to see if Phase II GSM location information will be reported in a timely manner (e.g., within a second or two or so) before committing to a default selection of a particular PSAP based on information available (e.g., based on the location of a serving cell site).

18 Claims, 11 Drawing Sheets

ISUP/GSM Logical Diagram

FIG. 1

1. Caller dials 911

| A | Mobile Station (MS) must be PCS1900 capable. | . |

FIG. 2

1.1 Cell tower routes emergency call to the appropriate switch.

| A | MSC knows Cell tower's unique 10-digit ESRD |
|---|---|
| B | Cell tower's control channel sends setup message with Dialed Digits and an identifier for the MS. |
| C | MSC knows MSISDN and IMSI based on MS identifier |

FIG. 3

1.2 Switch routes call via IAM message

| A | Switch is provisioned for all emergency calls to route to MPC's ISUP point code for the ISUP Handlers. |
|---|---|
| B | Switch assigns the call's Dialed Digits, MSISDN and ESRD to ISUP loop-around IAM's CalledPartyNumber, CallingPartyNumber and GDP, respectively. |

FIG. 4

2. ISUP Handler receives IAM message

| | |
|---|---|
| A | ISUP handler checks the switch profile for the cellsite indicated by the GDP=ESRD and that indicates "routing based on position". |
| B | System supports a statically pre-configured timer (T1) to wait for the incoming SubLocRpt message when "routing based on position". |
| C | Configurable timer (T1) starts as soon as the IAM1 is received. |
| D | If the T1 timer expires before the SubLocRpt for this call is received, then MPC will proceed with "routing based on cell sector, aka ESRD". |

FIG. 5

2.1 Stage initial call record [CSS]

| | |
|---|---|
| A | Initial call record is created with parameters from the IAM1 message (CSS) ESRD maps to pre-provisioned information about the cell tower MSISDN maps from the CallingPartyNumber. |
| B | T1 continues to run until timer expires or MAP Subscriber Location Report is received for the call. |

FIG. 6

2.2 MAP Subscriber Location Report message received from switch (MSC)

| | |
|---|---|
| A | MAP Subscriber Location Report Invoke message indicates that this is a new emergency call being originated.<br>Data passed includes but is not limited to:<br>    Call origination<br>    MSISDN (dialable or non-dialable callback number that matches the IAM1's Calling Party Number)<br>    Lat/lon of MS handset<br>    LCS Client ID<br>    MSC number<br>    ESRD (matches IAM1's GDP)<br>    IMS1 |
| B | MAP_Subscriber_Location_Report<br>Optional parameters (should be included if available)<br>    Age of location estimate (to be included if location estimate is included).<br>    Supplementary emergency services information.<br>    (Additional message parameters are documented in J-STD-036 Chapter 6 and GSM 09.02) |
| C | Error parameters for MPC's response to unacceptable MAP_Subcriber_Location_Report<br>These errors indicate an error in the invoke message or in the XLP that prevents the location related information from being accepted. The following error types are allowed:<br>    System failure<br>    Data missing<br>    Unexpected data value |

FIG. 7

2.3 Get ESZ and assign ESRK

| | |
|---|---|
| A | CRDB must be provisioned with appropriate ESZ information for lat/lon. |
| B | MPC associates incoming lat/lon for the MS handset in the correct Emergency Services Zone (ESZ) and PSAP as provisioned in the CRDB. |
| C | MPC is able to associate the ESZ with an appropriate ESRK from a pool of ESRK's for the call. |
| D | MPC provides a unique ESRK for the call (one that is unique to any active call at any given time) if there is one available. If all available ESRK's are in use, the MPC will use the ESRK from the "oldest" active call. |
| E | MPC must immediately mark the ESRK as "in use" to avoid (if possible) duplicate calls using the same ESRK. |

FIG. 8

2.4 Stage updated data in an MPC's active call record with lat/lon

| | |
|---|---|
| A | Match updated call data with the existing active call record created by IAM1 using:<br>MSISDN from SubLocRpt |
| B | The following parameters will be staged as a result of the SubLocRpt Invoke message:<br>ESRK<br>Lat/lon of the MS handset<br>Location estimate<br>Location accuracy: including inner radius, uncertainty radius, offset and included angle,<br>Age of estimate. |
| C | Second timer (T2) also initiated upon receipt of $IAM_1$ <u>ends</u> when updated call data is staged. |
| D | Staged call data is available for retrieval by the system until call is released. |
| E | Failure conditions<br>If for some reason posting in the CallData table fails, write an error record.<br>If ESRD, MSISDN or lat/lon of the MS handset are missing from the originating message, data should not be posted and an error message result returned to the requesting MSC. |

FIG. 9

3. Gateway provides routing for the emergency call with IAM2

| | |
|---|---|
| A | Precise Routing. The System causes the MSC to route each E911 call to the best PSAP based on SubLocRep Location Estimate, if SubLocRep Location Estimate is available for that caller within a statically pre-configured time interval (T1). |
| B | Cell Site Sector Routing Fallback. For a particular call, if SubLocRep Location Estimate is not available within the statically pre-configured time interval (T1), the MPC causes the MSC to route that call based on the caller's Cell Site Sector. |
| C | Default Routing Fallback. For a particular call, if neither SubLocRep Location Estimate nor Cell Site Sector is available for the caller within the pre-configured time interval (T1), the System causes the MSC to route that call to a pre-configured PSAP. |
| D | MAP Subscriber Location Report Response<br>Required parameters supported:<br>    Call origination |

PUBLIC SAFETY ACCESS POINT (PSAP) SELECTION FOR E911 WIRELESS CALLERS IN A GSM TYPE SYSTEM

This application claims priority from U.S. Provisional Patent Application No. 60/367,706, filed Mar. 28, 2002, entitled "Hybrid GSM/ISUP", the entirety of which is expressly incorporated herein by reference.

BACKGROUND OF THE INVENTION

1. Field of the Invention

This invention relates generally to wireless and long distance carriers, Internet service providers (ISPs), and information content delivery services/providers and long distance carriers. More particularly, it relates to location services for the wireless industry, particularly for E-9-1-1.

2. Background of Related Art

When you dial 911, the call is directed to an assigned local Public Safety Access Point (PSAP). The PSAP picks up the call along with an inbound telephone number or Automatic Number Identification (ANI) information. This number is used to query an Automatic Location Identification (ALI) database, match it with the corresponding address as a location of the caller, and forward the location information and inbound telephone number to the assigned PSAP. The PSAP can then deliver both the number and the location to the appropriate emergency service (fire, police and ambulance) so that the emergency response unit can proceed to the appropriate location.

This above scenario works well when the 911 call originates from a residence, since every residential number is associated with a unique residential address. However, for wireless devices which are highly mobile, exact location information is critical in determining the correct PSAP to be used.

E911 is short for Enhanced 911, a location technology advanced by the FCC that will enable mobile, or cellular, phones to process 911 emergency calls and enable emergency services to locate the geographic position of the caller. When a person makes a 911 call using a traditional phone with ground wires, the call is routed to the nearest public safety answering point (PSAP) that then distributes the emergency call to the proper services. The PSAP receives the caller's phone number and the exact location of the phone from which the call was made. Prior to 1996, 911 callers using a mobile phone would have to access their service providers in order to get verification of subscription service before the call was routed to a PSAP. In 1996 the FCC ruled that a 911 call must go directly to the PSAP without receiving verification of service from a specific cellular service provider. The call must be handled by any available service carrier even if it is not the cellular phone customer's specific carrier. Under the FCC's rules, all mobile phones manufactured for sale in the United States after Feb. 13, 2000, that are capable of operating in an analog mode must include this special method for processing 911 calls.

The FCC has rolled out E911 in two phases. In 1998, Phase I required that mobile phone carriers identify the originating call's phone number and the location of the signal tower, or cell, accurate to within a mile. Phase I of the FCC's E911 rules requires that a 7, 8 or 10 digit number accompany each 911 call, which allows the PSAP dispatcher to either call back if the call is disconnected or to obtain additional information such as the mobile's callback number. It also gives the dispatcher the location at the cell site that received the call as a rough indication of the caller's location.

In 2001, Phase II required that each mobile phone company doing business in the United States must offer handset- or network-based location detection capability so that the caller's location is determined by the geographic location of the cellular phone within 100 meter accuracy—not merely to the location of the tower that is transmitting its signal. The FCC refers to this as Automatic Location Identification (ALI). Phase II of the FCC's wireless 911 rules allows the dispatcher to know more precisely where the caller is located.

Advances in technologies that employ new or upgraded handsets have demonstrated significant progress. However, as a practical matter, current FCC rules permit only network-based (i.e., independent of handset type) solutions to meet the Phase II requirements in the short term. As a result, the current rule effectively precludes use of a handset-based (i.e., GPS-assisted or other interaction dependent on the handset) approach, which needs to gradually replace or upgrade current handsets. Thus, in September 1999, the FCC revised its rules to permit the phase-in of new or upgraded handsets in order for handset-based solutions to be a viable competitor for initial ALI deployment under Phase II, while making other revisions aimed at promoting wireless E911 and improving public safety.

As can be appreciated, PSAP assigned regions do not correspond to cell site coverage areas. Many cell sectors' RF coverage crosses state and county borders between PSAPs, but a wireless carrier is only able to configure their wireless switches regardless of the number of PSAP regions covered (i.e., as in Phase I requirements) to route to only a single PSAP per cell sector.

Prior to Phase II implementation, it is possible that a small percentage of 911 dialers will be routed to an improper PSAP. This is because the call is routed based on the particular cell site that was used to communicate, rather than to the correct PSAP assigned to a caller's location. In such an instance, wireless E911 calls would require a transfer between PSAPs (usually performed manually by personnel at the incorrect PSAP) because the geographic location of the caller did not correspond to the first PSAP dispatcher's jurisdiction.

J-STD-036 provides a protocol for non-GSM wireless systems to select the correct PSAP based on the caller's precise location, and has the capability to greatly reduce the number of E911 calls that must be transferred between PSAPs (thus speeding up service). However, GSM systems do not have a similar solution for PSAP routing based on the caller's location only for routing based on the particular cell tower used by the caller.

Currently, in non-GSM systems, a selective router switch is used to select the correct PSAP based on receipt of an ISUP GenericDigitsParameter that contains emergency service routing digits (ESRD). An ESRD is a 10 digit routable, but not necessarily dialable number that is used for routing to a PSAP—but only on a per origination cell sector basis. Thus, the ESRD helps a selective router route a call to the particular PSAP assigned to the cell sector serving the 911 caller, causing the occasional need for manual or other type transfer of the PSAP caller.

A new ISUP CallingGeodeticLocation (CGL) parameter was defined in April 2000 to help a selective router select the appropriate PSAP based on the caller's precise location, not based only on the location of the serving cell tower, but this technology requires a software upgrade (e.g., to the ISDN User Part (ISUP) software) at many switches, thus deterring any emergence of this type solution. In fact, this particular technology may never appear since non-GSM wireless switches already utilize an existing protocol (J-STD-036) to determine PSAP selection prior to routing out of the wireless switch and it is only GSM wireless switches that would be served by this type of solution.

There is a need for an apparatus and technology to provide improved PSAP selection to reduce the need for transfers between PSAPs, and consequently to allow help to arrive for a wireless 911 caller that much sooner.

SUMMARY OF THE INVENTION

In accordance with the principles of the present invention, a method of providing ESRK, ESRD or ESRV information for a wireless E911 caller comprises requesting accurate location information relating to the wireless E911 caller. The selection of a public safety access point is delayed a given amount of time until the requested accurate location information is received. A location relating to a serving base station is returned as a default condition in place of the requested accurate location information if the accurate location information is not received before expiration of the given amount of time.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention allows for PSAP selection based on ESRD substitution when ESRKs are not used. When ESRD substitution is used for PSAP selection, the caller's serving cell sector ESRD can be delivered after call setup on, e.g., an NCAS data link. Moreover, with the present invention, the wireless operator need not be the entity required to obtain ESRKs and otherwise work with PSAPs. Instead, this task can be delegated to an outside node, perhaps provided by a third party. With ESRD substitution, it is possible to replace all ESRKs for a PSAP and use a single substituted ESRD per PSAP. A single substituted ESRD is most cost effective, and is known as Emergency Services Routing Value (ESRV).

As is known, GSM is a European standard for telephone systems imported to North America. Currently, Europe does not have anything like E911 implemented, or if they do, the implementations do not include multiple jurisdictions like city, county and state.

The present invention was conceived as an ESRK workaround solution to implement Phase II of the E911 rules from the starting point of a Phase I implementation. ESRK is a 10-digit routable, but not necessarily dialable, number that is used not only for routing but also as a correlator, or key for mating of data that is provided to a PSAP by different paths, such as via a voice path and via an automatic location identification (ALI) path. In daily use, the term ESRK is often used to distinguish operational environments where the "routing" digits are assigned on a per destination PSAP basis as opposed to a per origination cell sector basis (which is the strict technical definition).

One possible GSM non-standard solution for Phase II involves ISUP loop-around technology to a GSM carrier. However, the relevant J-STD-036 standard lacks in many respects and places a burden on GSM wireless switch vendors who are generally unfamiliar with the vulgarities of E911 call setup routing in North America.

Accordingly, in accordance with the principles of the present invention, ESRKs or ESRVs are initially obtained and managed for each PSAP in a particular carrier's area. Also, importantly, Phase I processes are modified to wait to see if Phase II GSM location information will be reported in a timely manner (e.g., within a second or two or so) before resorting to the selection of a particular PSAP based on other information available (e.g., based on the location of a serving cell site).

Figure 1:
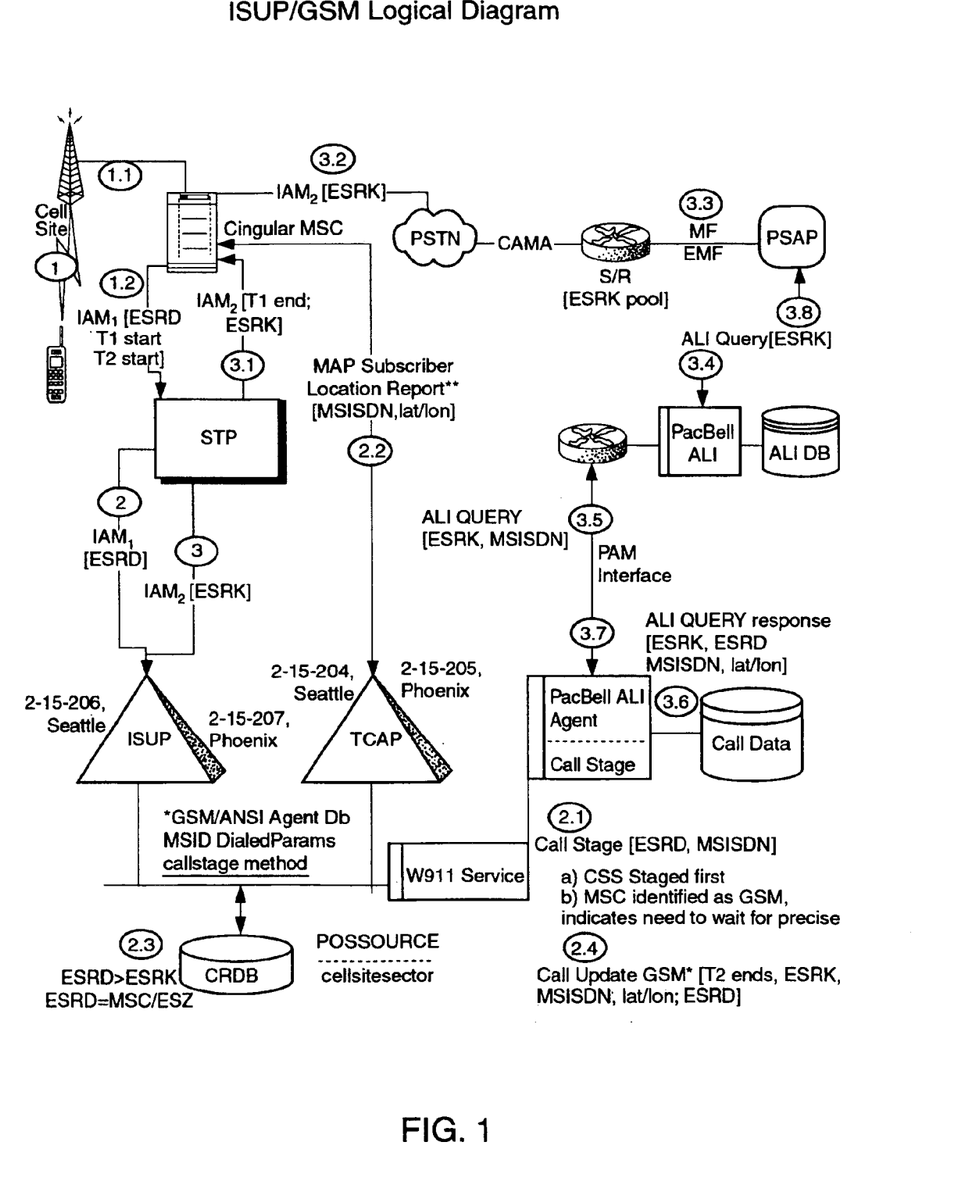
FIG. 1 shows an ISUP/GSM logical diagram, in accordance with the principles of the present invention.

FIG. 1 shows an ISUP/GSM logical diagram, in accordance with the principles of the present invention. The elements of FIG. 1 will be described with reference to FIGS. 2–11, which explain the signaling between the elements.

Figure 2:
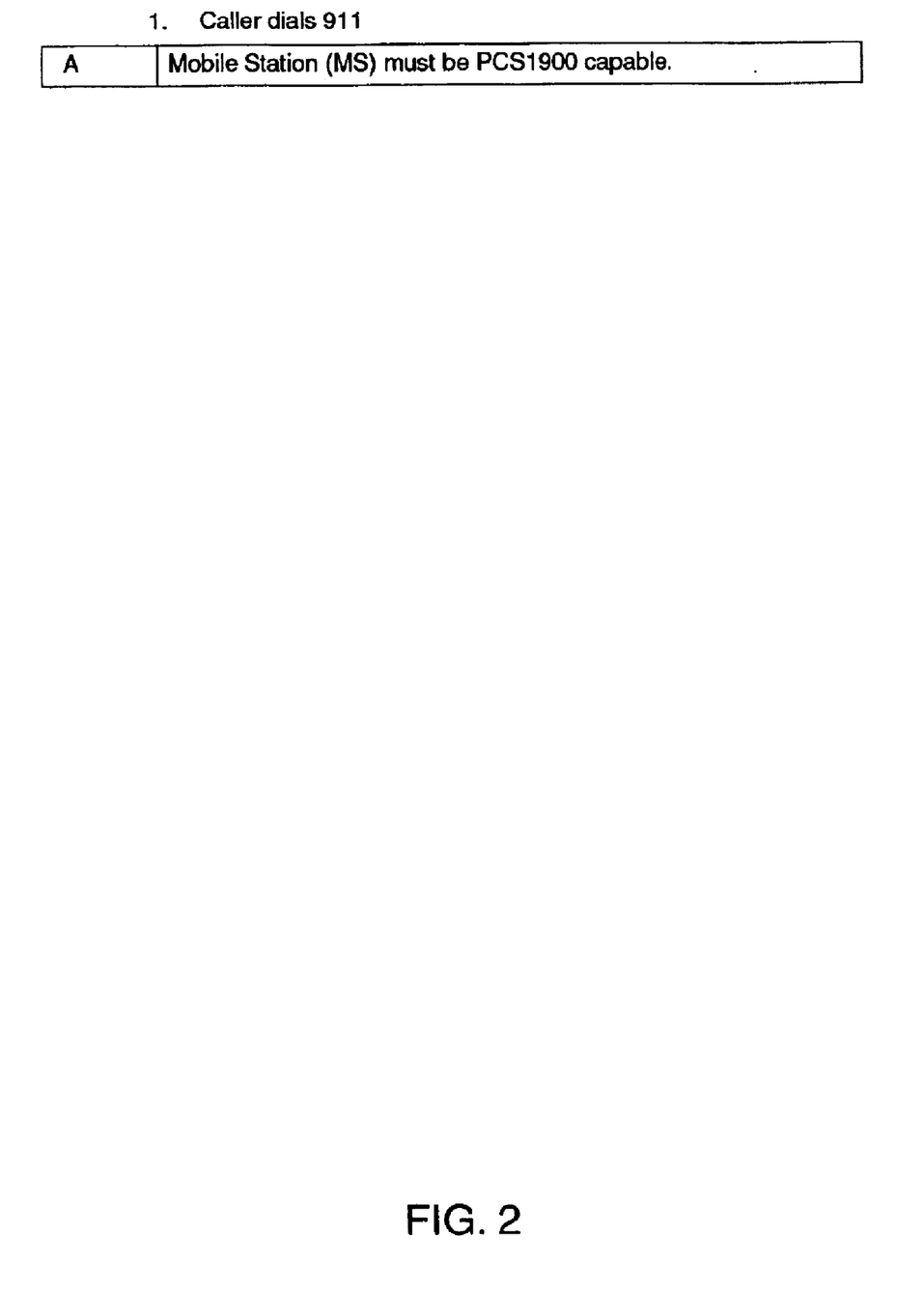
FIG. 2 shows an exemplary step for a mobile device caller to dial an emergency number (e.g., "9-1-1" in North America, "1-1-2" in Europe, etc.) shown in FIG. 1.

FIG. 2 shows an exemplary step for a mobile device caller to dial an emergency number (e.g., "9-1-1" in North America, "1-1-2" in Europe, etc.) shown in FIG. 1.

In particular, as shown in FIG. 2, the step 1 shown in FIG. 1 is associated with a wireless caller dialing 9-1-1 (i.e., placing an E911 call). It is presumed for the purposes of the disclosed embodiment that the mobile station used by the wireless caller is PCS1900 compatible.

Figure 3:
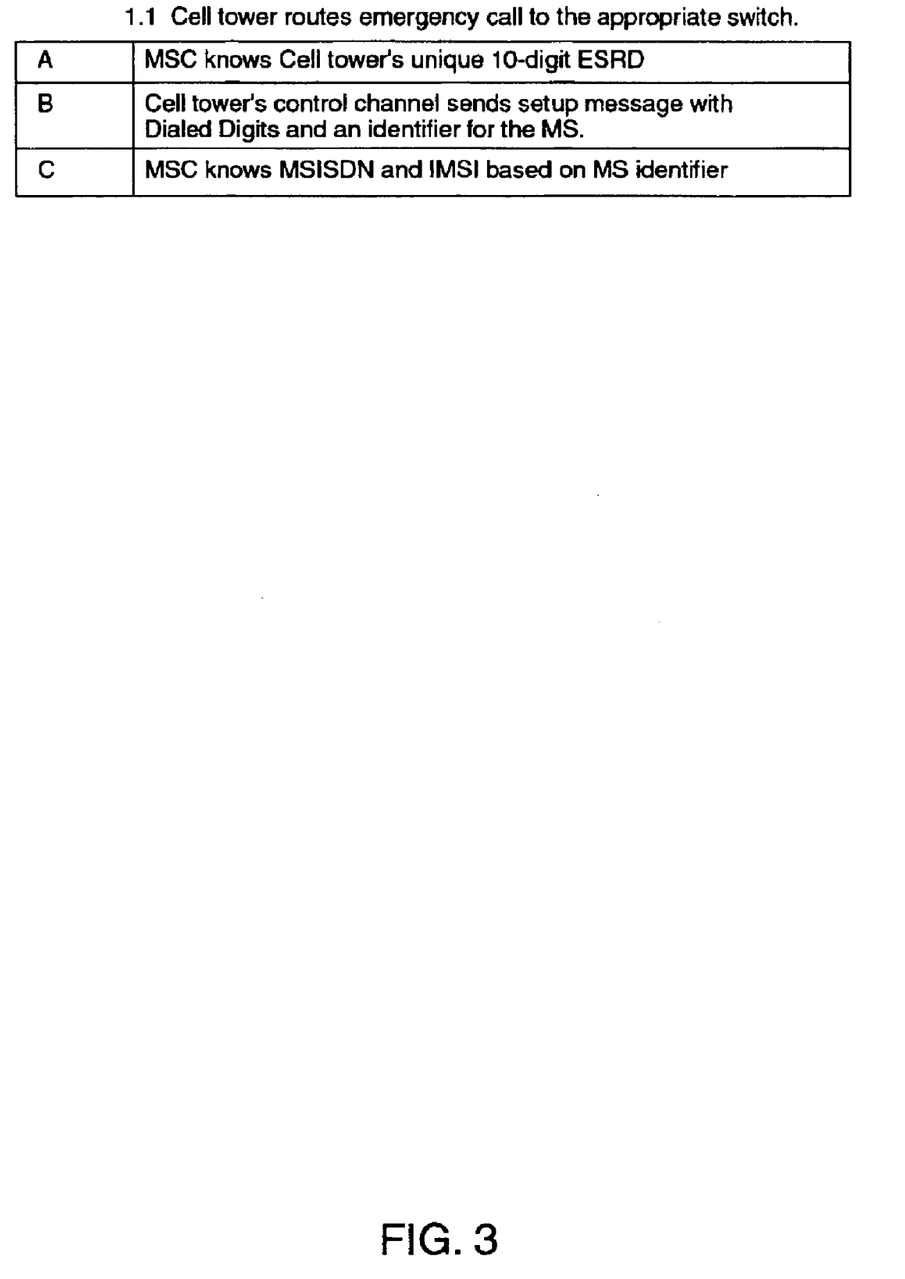
FIG. 3 shows exemplary steps for a cell tower to route an emergency call to an appropriate switch, as shown in FIG. 1.

FIG. 3 shows exemplary steps for a cell tower to route an emergency call to an appropriate switch, as shown in FIG. 1.

In particular, step 1.1 shown in FIG. 3 represents a cell tower routing an emergency call to the appropriate PSAP. In sub-step A of 1.1, the mobile switching center (MSC) knows the cell tower's unique 10-digit ESRD.

In sub-step B, the cell tower's control channel sends a setup message with dialed digits and an identifier for the E911 caller's mobile station.

In sub-step C, the MSC knows the MSISDN and IMSI based on the MS identifier.

Figure 4:
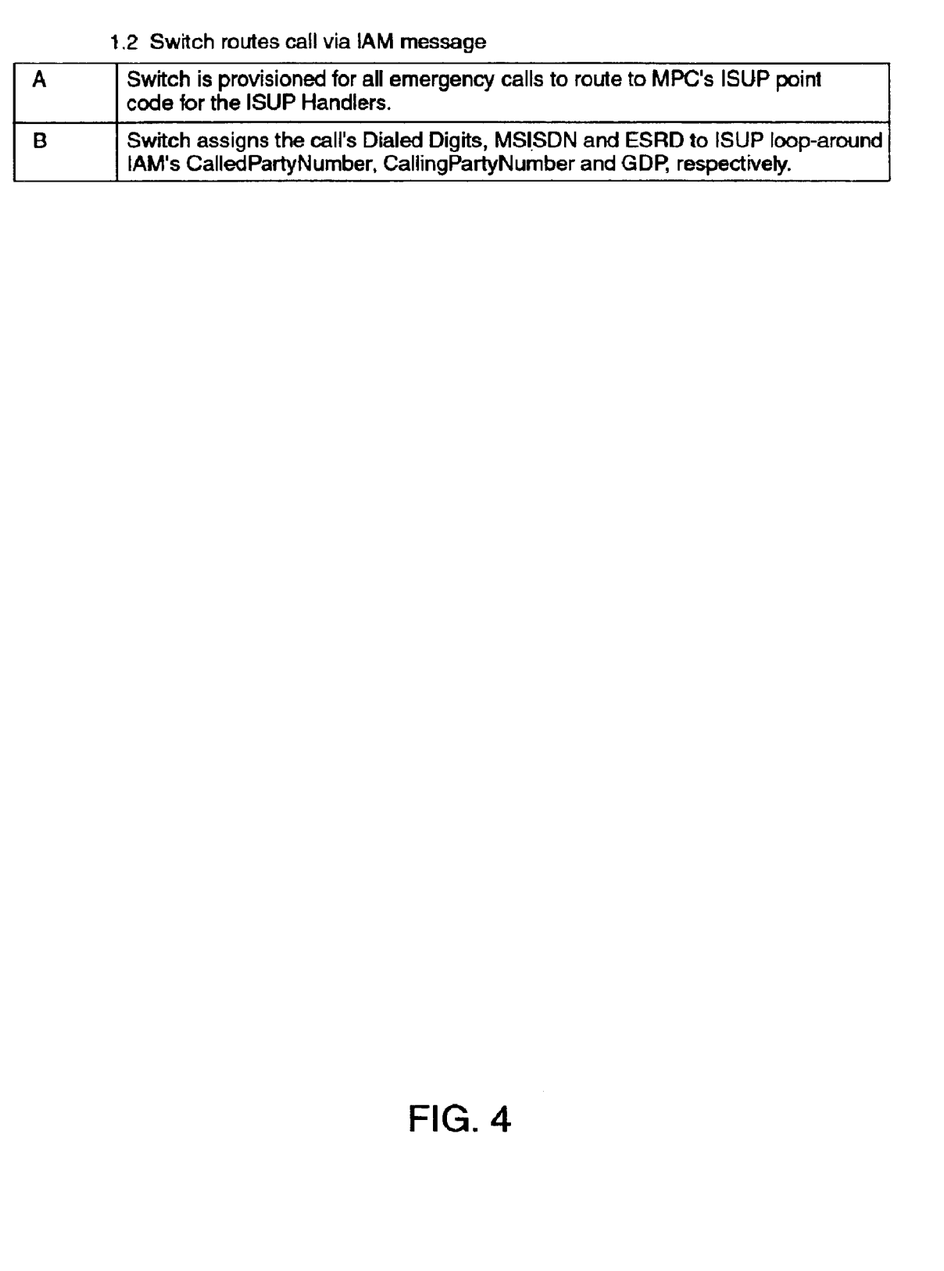
FIG. 4 shows exemplary steps of a switch routing a call via an IAM message, as shown in FIG. 1.

FIG. 4 shows step 1.2 shown in FIG. 1, wherein a switch routes a call via an IAM message. In sub-step A, the switch is provisioned for all emergency calls to route to the GMLC or MPC/GMLC ISUP point code for the ISUP handlers. In sub-step B, the switch assigns the call's dialed digits, MSISDN and ESRD to ISUP loop-around IAM's CalledPartyNumber, CallingPartyNumber and GDP, respectively.

Figure 5:
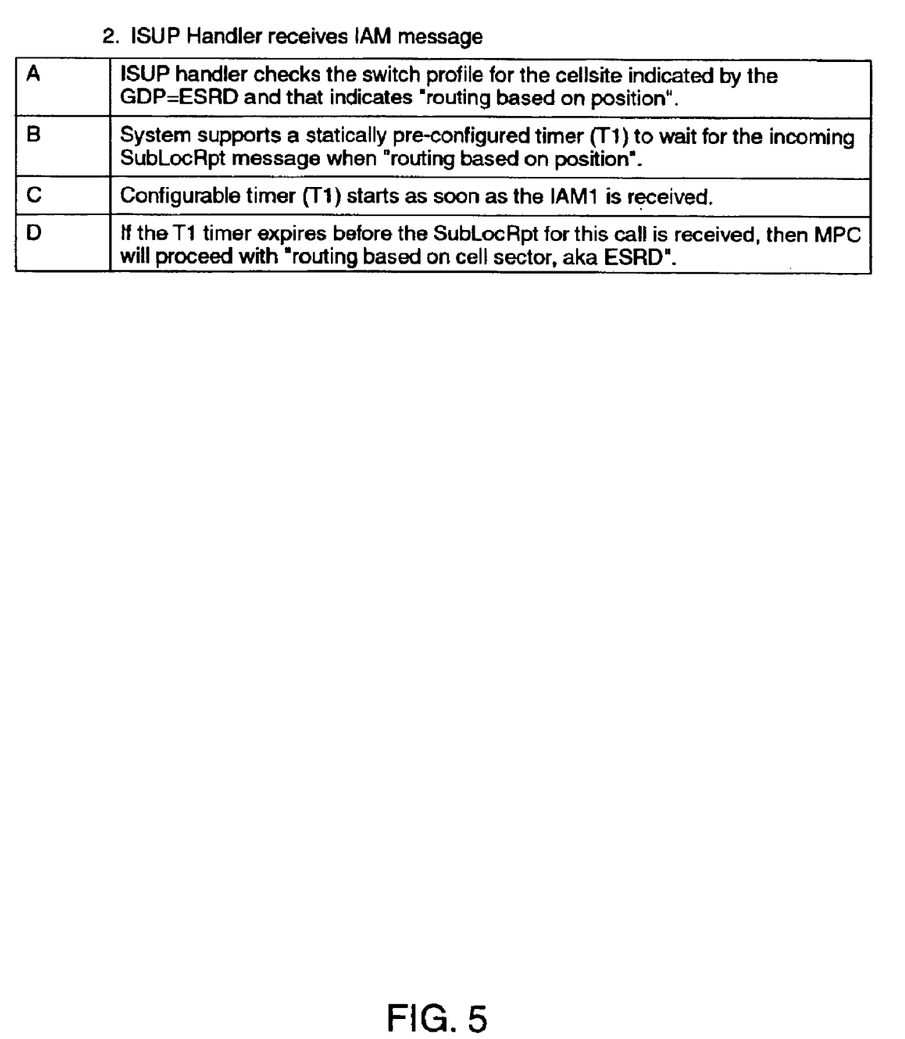
FIG. 5 shows exemplary steps of an ISUP handler receiving an IAM message, as shown in FIG. 1.

FIG. 5 shows step 2 shown in FIG. 1, wherein an ISUP handler receives an IAM message. In sub-step A, the ISUP handler checks the switch profile for the cell site indicated by the GDP=ESRD and that indicates "routing based on position". In sub-step B, the system supports a statically pre-configured timer (T1) to wait for the incoming Sub-LocRpt message when "routing based on position". In sub-step C, the configurable time starts as soon as the IAM1 is received. In sub-step D, if the timer expires before the SubLocRpt for this call is received, then MPC will proceed with "routing based on cell sector", otherwise known as ESRD.

In accordance with the principles of the present invention, GSM Phase I wireless E911 loop-around technology is combined with the Phase II J-STD-036 standard for PCS1900, aka North American GSM. Moreover, and importantly, the PSAP selection and the Phase I loop-around routing out of the GSM switch are delayed to see if a Phase II precise location becomes available for routing based on the E911 caller's location (i.e., position). To avoid dead time in an emergency E911 call, a configurable timer may be implemented. The timer is started during the call's routing. Then, if the configurable timer expires before any location for the E911 caller is obtained, routing based on cell sector (i.e., reverting back to Phase I requirements) can proceed by default.

Figure 6:
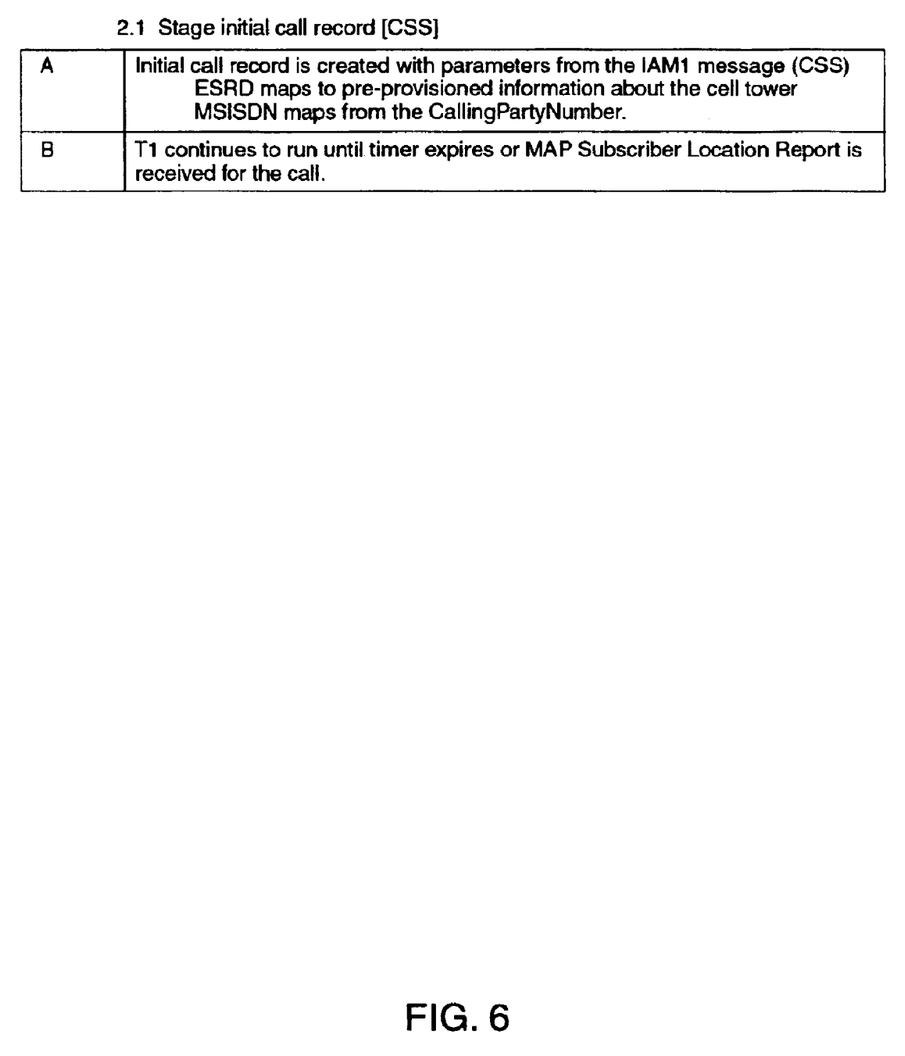
FIG. 6 shows exemplary steps of staging an initial call record [CSS], as shown in FIG. 1.

FIG. 6 shows step 2.1 shown in FIG. 1, wherein an initial call record [CSS] is staged. In sub-step A, an initial call record is created with parameters from the IAM1 message (CSS) ESRD maps to pre-provisioned information about the cell tower MSISDN maps from the CallingPartyNumber. In sub-step B, the timer T1 continues to run until it either expires or the MAP Subscriber Location Report is received for the call.

Figure 7:
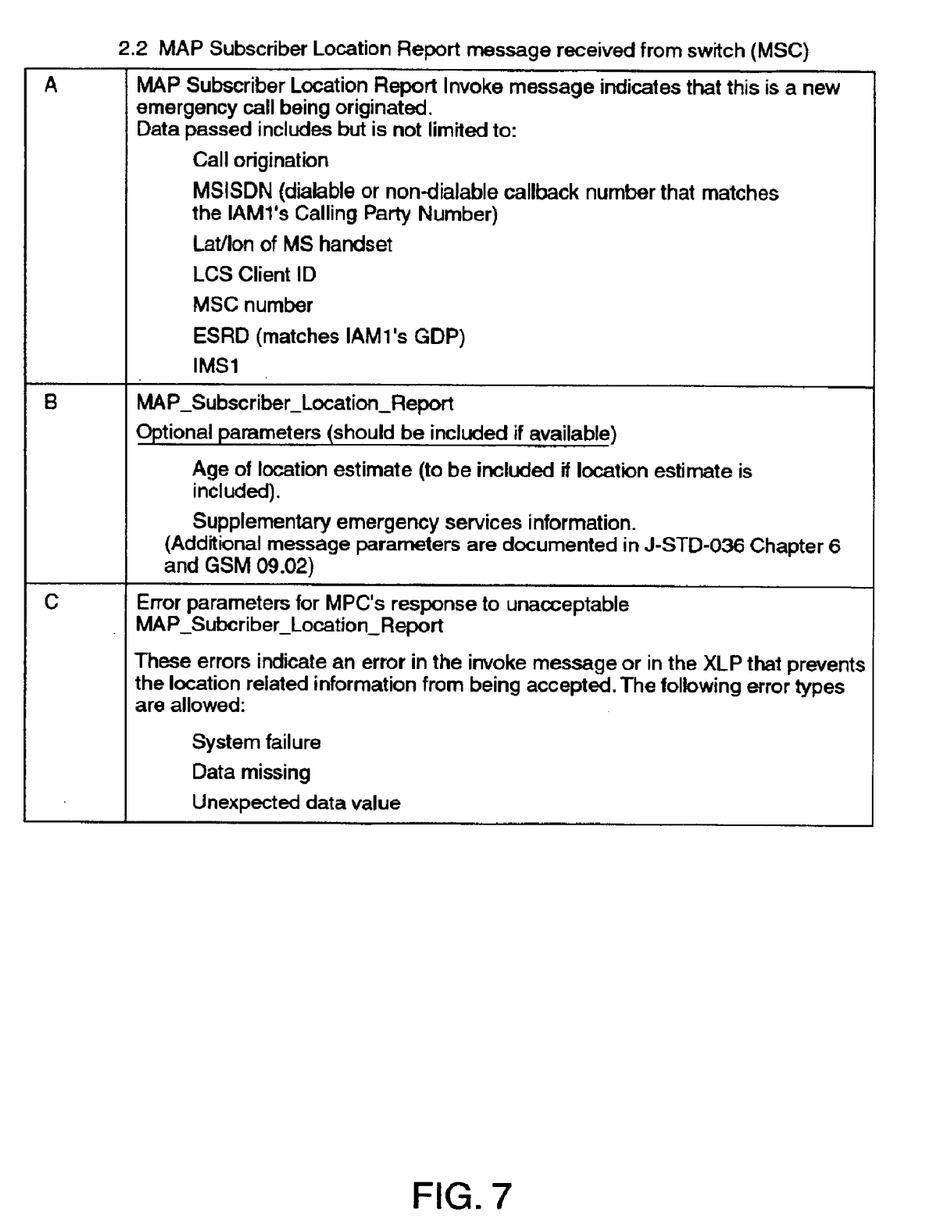
FIG. 7 shows exemplary steps of a MAP subscriber location report message received from a switch (i.e., an MSC), as shown in FIG. 1.

FIG. 7 shows step 2.2 shown in FIG. 1, wherein a MAP subscriber location report message is received from a switch (i.e., an MSC). In sub-step A, a MAP Subscriber Location Report Invoke message indicates that the relevant call is the origination of a new emergency call. Exemplary data transmitted in this sub-step includes, but is not limited to, Call origination, MSISDN (i.e., a dialable or non-dialable callback number that matches the IAM1's CallingPartyNumber), latitude/longitude of the calling party's mobile device, LCS Client ID, MSC number, ESRD (which matches the IAM1's GDP) and usually an IMSI.

In sub-step B of step 2.2 shown in FIG. 7, a MAP_Subscriber_Location_Report message includes optional parameters that are preferably included if available. Exemplary optional parameters include, e.g., the age (or time stamp) of any included location estimate of the caller, and/or any supplementary emergency services information (e.g., patient information). Additional message parameters may correspond to those documented in the standards J-STD-036 Chapter 6 and GSM 09.02.

Sub-step C relates to error parameters for the MPC/GMLC's response to an unacceptable MAP_Subscriber_Location_Report. These errors indicate an error in the invoke message or in the MPC/GMLC that prevents the location related information from being accepted. The following exemplary error types are allowed in the disclosed embodiment: "system failure", "data missing", and "unexpected data value", or similar information.

Figure 8:
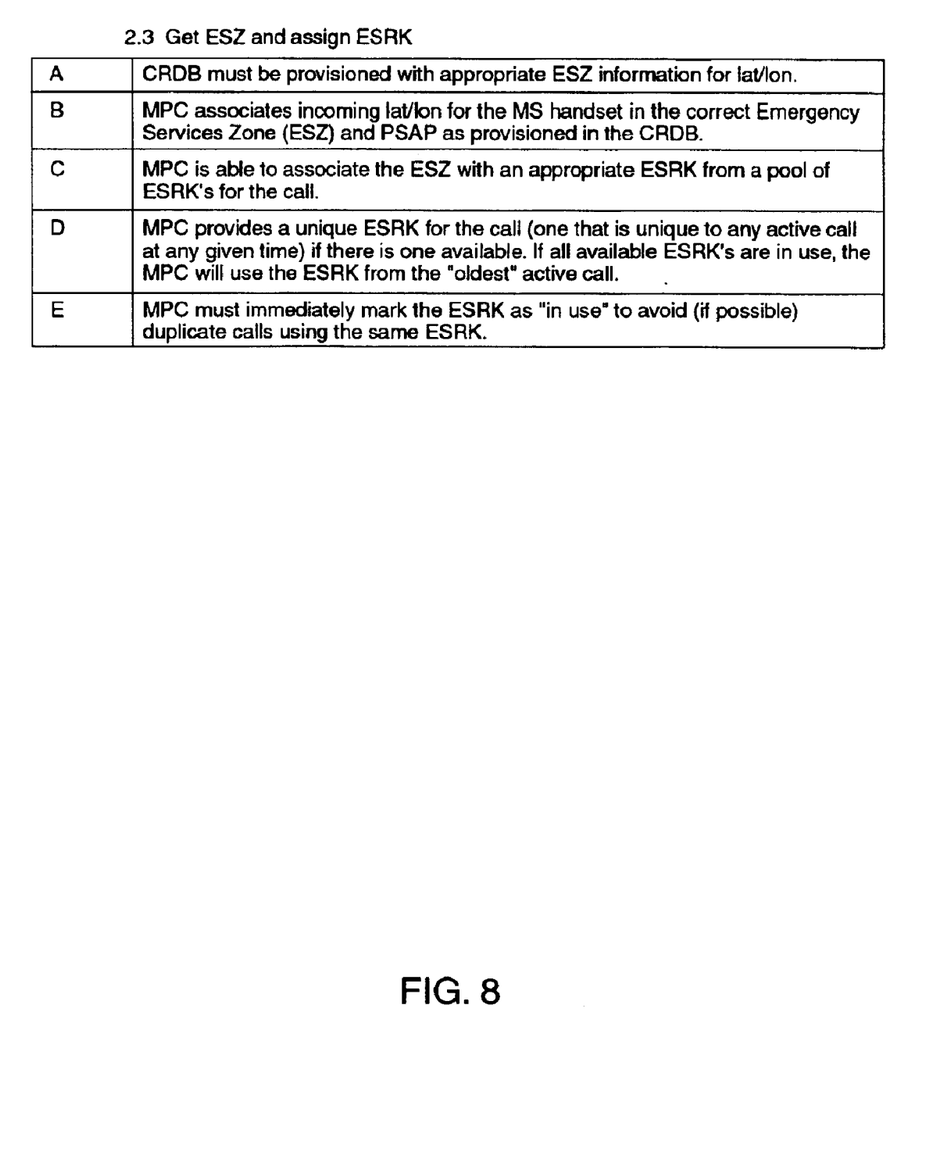
FIG. 8 shows exemplary steps of obtaining ESZ and of assigning an ESRK, as shown in FIG. 1.

FIG. 8 shows step 2.3 shown in FIG. 1, wherein the emergency services zone (ESZ) is obtained and the ESRK is assigned. In sub-step A, the CRDB must be provisioned with appropriate emergency services zone information for latitude and longitude.

In sub-step B, the MPC/GMLC associates incoming latitude/longitude location or presence information for the caller's mobile station to the correct emergency services zone and PSAP as provisioned in the CRDB.

In sub-step C of FIG. 8, the MPC/GMLC is able to associate the emergency services zone with an appropriate ESRK from a pool of ESRKs for the call.

In sub-step D, the MPC/GMLC provides a unique ESRK for the call (if there is one available). The ESRK is unique in that it is unique to any active call at any given time. The ESRKs may and will be reused over time. If all maintained ESRKs are in use, the MPC/GMLC will use the ESRK from the "oldest" active call.

In sub-step E, the MPC/GMLC preferably immediately marks the ESRK as "in use" to avoid (if possible) duplicate calls using the same ESRK.

Figure 9:
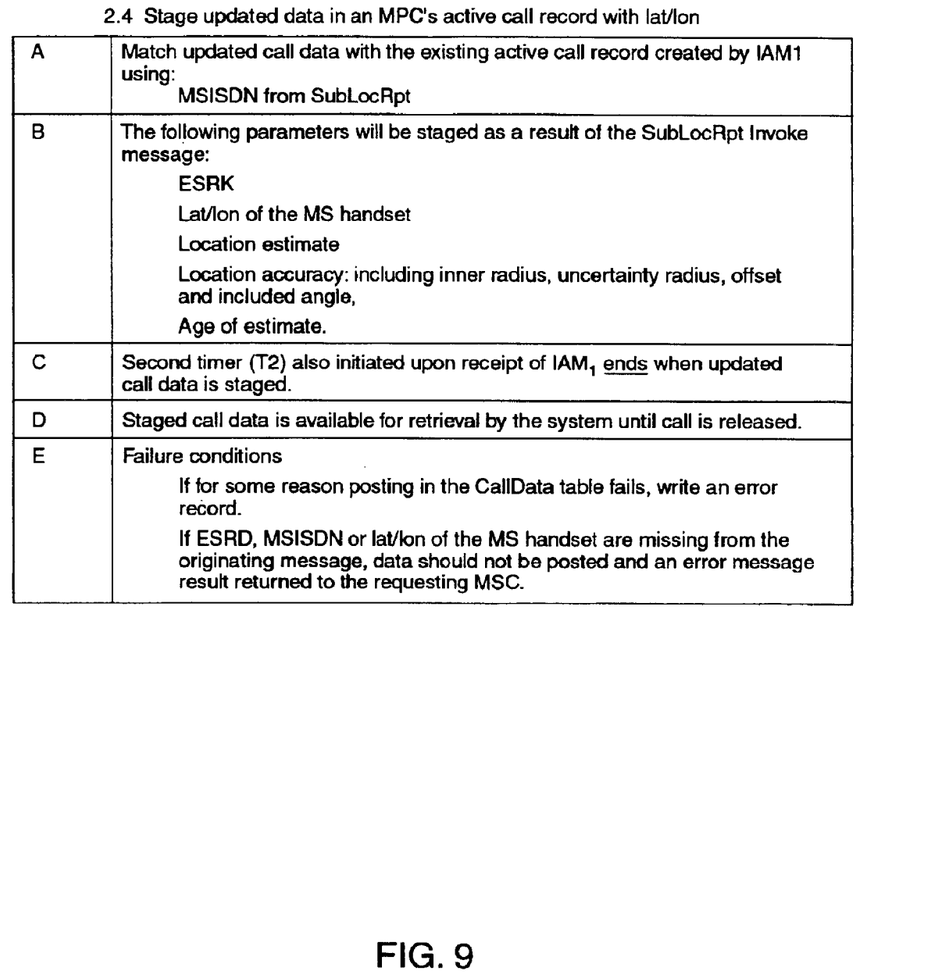
FIG. 9 shows exemplary steps of staging updated data in an MPC's active call record with latitude and longitude (lat/lon), as shown in FIG. 1.

FIG. 9 shows step 2.4 shown in FIG. 1, wherein updated data is staged in an MPC/GMLC's active call record with latitude and longitude (lat/lon). In sub-step A, updated call data is matched with the existing active call record created by IAM1 using MSISDN from SubLocRpt.

In sub-step B, the following parameters are preferably staged as a result of receiving the SubLocRpt Invoke message: ESRK; latitude/longitude of the caller's mobile device; location estimate; location accuracy (e.g., including inner radius, uncertainty radius, offset and included angle); and age of estimate, time stamp or other time-based information related to the location determination.

In sub-step C, the second timer T2 is initiated upon receipt of IAM1 ends information, when updated call data is staged. In sub-step D, staged call data is made available for retrieval by the system until the call is released. In sub-step E, failure conditions may be reached, e.g., if for some reason posting in the CallData table fails, in which case an error record would be written. Also, if ESRD, MSISDN or latitude/longitude information of the caller's mobile device are missing from the originating message, data should not be posted and an error message result should be returned to the requesting MSC.

Figure 10:
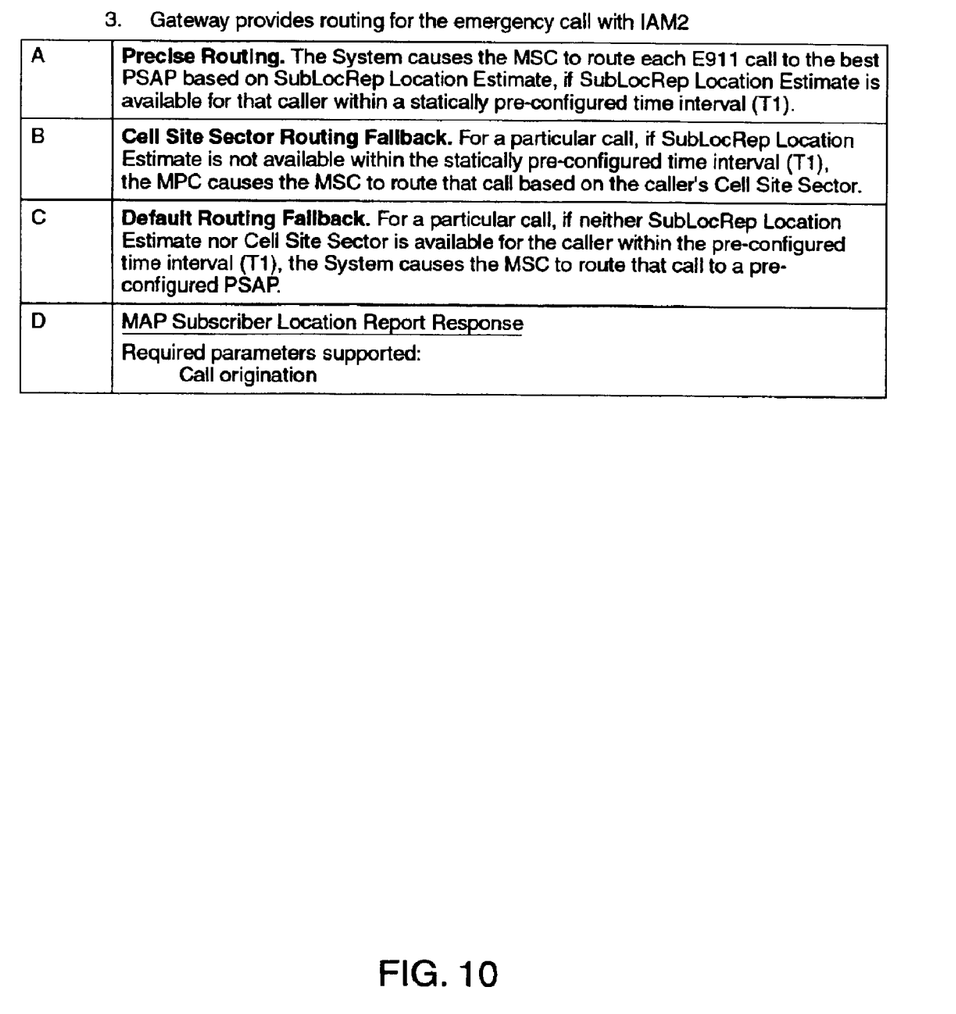
FIG. 10 shows exemplary steps of a wireless network gateway providing routing for an emergency call with IAM2, as shown in FIG. 1.

FIG. 10 shows step 3 shown in FIG. 1, wherein a wireless network gateway provides routing for an emergency call with IAM2. In sub-step A, precise routing is accomplished. In particular, the system causes the MSC to route each E911 call to the best PSAP based on a SubLocRep location estimate, if the SubLocRep location estimate is available for that caller within a statically pre-configured time interval (based on the first timer T1 as described herein).

In sub-step B, the PSAP is determined based on the fallback of cell site sector identification. For a particular cell site, if the SubLocRep location estimate is not available within the statically pre-configured time interval T1, then the MPC/GMLC causes the MSC to route that call based on the identity of the cell site currently serving the caller (and the PSAP assigned to that cell site).

In sub-step C, default routing is fallen back on. For a particular call, if neither the SubLocRep location estimate is available for the caller, nor the identity of the cell site sector, within the pre-configured time interval T1, the system causes the MSC to route that call to a pre-configured default assigned PSAP.

In sub-step D, a MAP subscriber location report response is generated, including parameters such as call origination.

In steps 3.1 and 3.2 of FIG. 1, the MSC receives the IAM2 and tandems the call to the PSTN with IAM3.

Figures 11A, 11B:
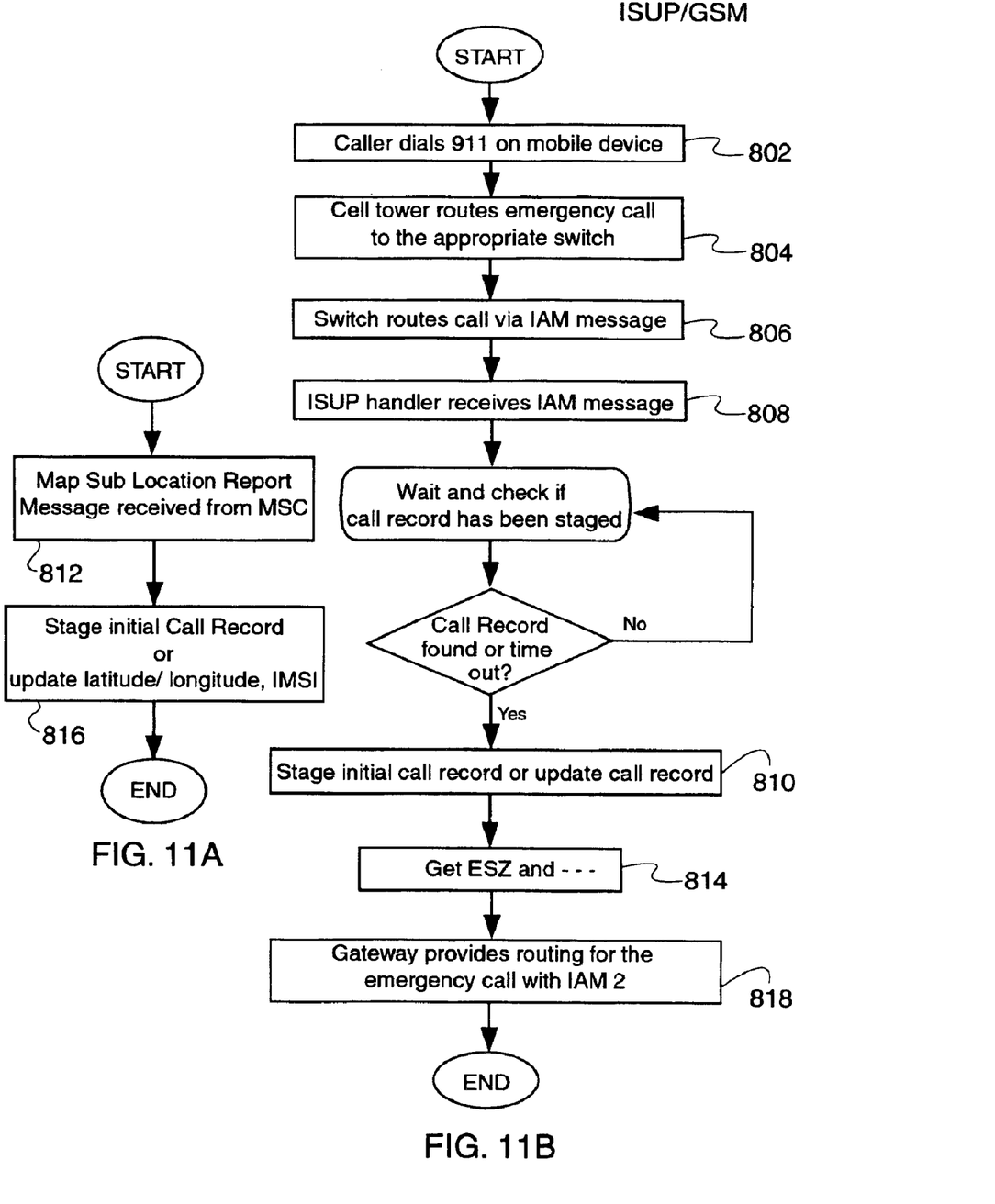
FIGS. 11A and 11B summarize the exemplary ISUP/GSM location process shown and described in FIGS. 1–10.

FIGS. 11A and 11B summarize the exemplary ISUP/GSM location process shown and described in FIGS. 1–10, in accordance with the principles of the present invention. FIGS. 11A and 11B are shown in parallel since the reception of SubLocRep is parallel to the ISUP Handler process.

In particular, as shown in step 802 of FIG. 11B, the wireless caller dials 911 on a mobile device (i.e., an E911 caller).

In step 804, the cell tower routes the emergency call to the appropriate switch.

In step 806, the switch routes the call via the IAM message.

In step 808, the ISUP handler receives the IAM message.

In step 810, the initial call record [CSS] is staged.

In step 812, the MAP Subscriber Location Report message is received from the switch (i.e., from the mobile switching center (MSC)).

In step 814, the emergency services zone (ESZ) is obtained, and a unique ESRK is assigned.

In step 816, updated location data is staged, e.g., in an MPC's active call record. Preferably the location data includes latitude and longitude information.

In step 818, a gateway provides routing for the emergency E911 call with IAM2 messaging.

Thus, in accordance with the principles of the present invention, the precise location that is obtained with existing location determining equipment can be used to query a coordinates routing database (CRDB) where the E911 PSAP (or a pizza delivery area for a non-E911 application, etc.) can be selected based on the latitude and longitude coordinates of the wireless caller before the call is routed out of the GSM switch. This means the wireless carrier is able to control the destination selection without dependence on another carrier such as the LEC. Current GSM standards do not describe the sequence of steps that coordinate the protocol necessary for location determining equipment to interact with routing decisions at a GSM switch.

When common channel signaling and ISDN are available to setup the voice path between the relevant wireless switch and assigned PSAP, Call Associated Signaling (CAS) is capable of delivering a full twenty digits to the PSAP's call display when the E911 call is answered. Ten (10) of these digits are the caller's callback number and another ten (10) digits are an ESRD that represents the caller's serving cell sector. The ESRD or substituted ESRD (i.e., ESRV) may be used by the selective router to choose the assigned PSAP and it may also be used by the PSAP to obtain an address for the cell sector. In the ESRV case, it can help the PSAP determine where to get the actual serving call sector. These twenty (20) digits are considered to be required for "Phase I" E911 wireless channel associated signaling (CAS) service.

FCC Order number 98-xxxx requires "Phase II" E911 wireless service to also provide the caller's location within 125 meters 95% of the time. Common channel signaling standards have added a new CGL parameter and the T1-628-2000 standard was revised to define the mapping of an E911 caller's latitude and longitude into the ISUP CGL parameter. This parameter is transferred into the ISDN GenericInformation (GI) parameter for the PSAP's display equipment to convert to a street address. As of early 2002, the CGL parameter is not able to select the PSAP at the local exchange carrier's selective router, and commercial PSAP equipment is typically not modified to convert an ISDN GI parameter to a street address. In other words, CAS Phase II may not be an E911 option for many years into the future for many PSAPs due to the less than optimal networks and equipment used by the PSAPs.

In fact, for certain cases that apply to this invention, it may be necessary to substitute the ESRD used for call routing and setup, before the E911 call leaves the wireless switch, to overrule which PSAP that a selective router would otherwise choose based on the caller's serving sector ESRD, in order to ensure that the call will use an ESRD that will route to the PSAP that is indicated by the caller's precise position! When this is needed, the correct ESRD that represents the caller's serving cell sector can be presented to the PSAP's display equipment over a Non-Call Associated Signaling (NCAS) path. NCAS is a viable E911 option for Phase II given the constraints of less than optimal call setup routing and PSAP equipment.

Since most PSAP equipment is not able to accept 20 digits and can only accept 10 digits or even less, "ISUP loop-around" technology allows a third party vendor to assign a "key" that the PSAP can use. The industry calls this key an ESRK. E911 calls that contain ESRKs are not subjected to PSAP selection by ESRD at the local exchange carrier's selective router. The ESRK is passed to the PSAP using the less than optimal available call routing and setup. The PSAP passes the ESRK back to the third party over NCAS and this is used to retrieve the information.

ESRKs are assigned to a pool for each PSAP. Then, each successive wireless E911 call is assigned an ESRK from the pool that corresponds to the PSAP indicated by the caller's serving cell sector or with Phase II technology, the pool that corresponds to the PSAP indicated by the caller's precise location.

GSM wireless switches have demonstrated two deficiencies that "ISUP loop-around" technology is able to overcome the GSM wireless switch being only able to select the PSAP pool based on the caller's serving cell sector. The solution to these problems is not confined to "ISUP loop-around" technology. Rather, the same function can be accomplished using other messages. Regardless, what must occur is for the GSM wireless switch to delegate these decisions to a node outside of GSM and deliver the caller's callback number and serving cell sector, e.g., via ISUP or TCAP technology to a third party's Mobile Position Center (MPC). Per the J-STD-036 standard, the GSM wireless switch will deliver a TCAP SubscriberLocationReport message that contains the caller's precise location to a GSM GMLC, which can be the same node as the MPC.

The outside node correctly selects the assigned PSAP based on the caller's location or position by (1) marrying Phase I information gleaned from the ISUP loop-around call setup message at an MPC; (2) modifying the ISUP loop-around technology to postpone the selection of PSAP and hence selection of ESRK that will be used for the GSM E911 call until a configurable timer expires; or better, (3) having the Phase II GSM TCAP location information arrive at the GMLC in time to influence the MPC's ESRK selection. Thus, MPC implies ISUP side, whereas GMLC implies GSM side.

If the TCAP location information does not arrive, the PSAP is selected based on the Phase I information. In either case, the ISUP loop-around or TCAP technology completes the call setup back to the GSM wireless switch, ultimately leading to egress out of GSM towards the PSAP.

When the call setup requires what the industry calls "Hybrid CAS" (HCAS), the ESRD and callback number form the key that replaces the need for an ESRK. An ESRV can replace the need for an ESRD.

The outside node is preferably also able to manipulate the PSAP selection for HCAS. However, instead of choosing an ESRK from an indicated PSAP's pool, a known ESRD or ESRV that is associated with the indicated PSAP can be used for call setup routing to the PSAP. As noted above, the local exchange carrier's selective router will use the ESRD to select a PSAP, and will be oblivious as to whether this ESRD represents the caller's serving cell sector or represents an ESRV that corresponds to the PSAP that is indicated by the caller's precise location.

Accordingly, it is most likely that a transfer between PSAPs has been avoided when a call is answered by the PSAP indicated by the caller's precise location, when the PSAP is different from another PSAP indicated by the E911 caller's serving cell sector.

Two main benefits to the present invention are 1) the ability for GSM to offload the management of ESRK assignments; and 2) the ability to use precise location information for wireless E911 calls to influence ESRK or ESRD or ESRV assignments, leading to better accuracy in PSAP selection and fewer PSAP transfers.

Furthermore, call setup routing to the local exchange carrier's selective router is notoriously complex and not standard. By offloading the ESRK selection and hence the call setup routing that is ultimately required, the GSM wireless switch need only "tandem" an E911 call, rather than have to be configured to the myriad of parameter combinations that are currently in use. ISUP loop-around technology appears as a "tandem" call, and thus everything is pre-configured so that the GSM wireless switch merely passes thru what it receives from the outside node.

With the present invention, GSM wireless switches in North America can achieve parity with ANSI wireless switches where J-STD-036 has provided a protocol to accomplish "routing based on position" that does not rely on selective router technology.

While the present invention describes routing based on location with respect to E911 applications, the present invention is equally applicable to non-E911 applications.

While the invention has been described with reference to the exemplary embodiments thereof, those skilled in the art will be able to make various modifications to the described embodiments of the invention without departing from the true spirit and scope of the invention.

What is claimed is:

1. A method of providing ESRK, ESRD or ESRV information for a wireless E911 caller, comprising:
   requesting accurate location information relating to said wireless E911 caller;
   delaying selection of a public safety access point a given amount of time until said requested accurate location information is received; and
   returning a location relating to a serving base station as a default condition in place of said requested accurate location information if said accurate location information is not received before expiration of said given amount of time.

2. The method of providing ESRK, ESRD or ESRV information for a wireless E911 caller according to claim 1, wherein:
   said accurate location information is linked with an ESRK.

3. The method of providing ESRK, ESRD or ESRV information for a wireless E911 caller according to claim 2, wherein:
   said ESRK, ESRD or ESRV information is routing information at least 20 digits in length.

4. The method of providing ESRK, ESRD or ESRV information for a wireless E911 caller according to claim 1, wherein:
   said accurate location information is provided via ISDN User Port (ISUP).

5. The method of providing ESRK, ESRD or ESRV information for a wireless E911 caller according to claim 1, wherein:
   said location of a serving base station is indicated by an emergency services routing digit (ESRD) number.

6. The method of providing ESRK, ESRD or ESRV information for a wireless E911 caller according to claim 5, wherein:

said ESRD is limited to be no longer than 10 digits.

7. The method of providing ESRK, ESRD or ESRV information for a wireless E911 caller according to claim 1, further comprising:

starting a timer to count a pre-configured amount of time.

8. The method of providing ESRK, ESRD or ESRV information for a wireless E911 caller according to claim 7, wherein:

said pre-configured amount of time is no more than approximately 2 seconds.

9. The method of providing ESRK, ESRD or ESRV information for a wireless E911 caller according to claim 7, wherein:

said timer is triggered at least in part to start by said request for said ESRK information.

10. Apparatus for providing ESRK, ESRD or ESRV information for a wireless E911 caller, comprising:

means for requesting accurate location information relating to said wireless E911 caller;

means for delaying selection of a public safety access point a given amount of time until said requested accurate location information is received; and means for returning a location relating to a serving base station as a default condition in place of said requested accurate location information if said accurate location information is not received before expiration of said given amount of time.

11. The apparatus for providing ESRK, ESRD or ESRV information for a wireless E911 caller according to claim 10, wherein:

said accurate location information is linked with an ESRK.

12. The apparatus for providing ESRK, ESRD or ESRV information for a wireless E911 caller according to claim 11, wherein:

said, ESRK, ESRD or ESRV information is routing information at least 20 digits in length.

13. The apparatus for providing ESRK, ESRD or ESRV information for a wireless E911 caller according to claim 10, wherein:

said accurate location information is provided via ISDN User Port (ISUP).

14. The apparatus for providing ESRK, ESRD or ESRV information for a wireless E911 caller according to claim 10, wherein:

said location of a serving base station is indicated by an emergency services routing digit (ESRD) number.

15. The apparatus for providing ESRK, ESRD or ESRV information for a wireless E911 caller according to claim 14, wherein:

said ESRD is limited to be no longer than 10 digits.

16. The apparatus for providing ESRK, ESRD or ESRV information for a wireless E911 caller according to claim 10, further comprising:

means for starting a timer to count a pre-configured amount of time.

17. The apparatus for providing ESRK, ESRD or ESRV information for a wireless E911 caller according to claim 16, wherein:

said pre-configured amount of time is no more than approximately 2 seconds.

18. The apparatus for providing ESRK, ESRD or ESRV information for a wireless E911 caller according to claim 16, wherein:

said timer is triggered at least in part to start by said request for said ESRK, ESRD or ESRV information.

* * * * *